US012717304B2

(12) United States Patent
Chen et al.

(10) Patent No.: US 12,717,304 B2
(45) Date of Patent: Aug. 25, 2026

(54) WATER LEVEL SENSOR ALARM

(71) Applicant: Taiwan Semiconductor Manufacturing Company, Ltd., Hsinchu (TW)

(72) Inventors: Chun-Shuo Chen, Taichung City (TW); Hsuan-Yuan Wu, New Taipei City (TW); Kai Yuan Chan, Tainan City (TW); Chien Chou Ko, Tainan County (TW)

(73) Assignee: Taiwan Semiconductor Manufacturing Company, Ltd.

( * ) Notice: Subject to any disclaimer, the term of this patent is extended or adjusted under 35 U.S.C. 154(b) by 253 days.

(21) Appl. No.: 18/459,511

(22) Filed: Sep. 1, 2023

(65) Prior Publication Data

US 2025/0076846 A1 Mar. 6, 2025

(51) Int. Cl.

*G05B 19/409* (2006.01)
*G05B 19/4099* (2006.01)
*G08B 21/18* (2006.01)

(52) U.S. Cl.

CPC ....... *G05B 19/4099* (2013.01); *G08B 21/182* (2013.01); *G05B 2219/45031* (2013.01)

(58) Field of Classification Search

None

See application file for complete search history.

(56) References Cited

U.S. PATENT DOCUMENTS

| | | | | |
|---|---|---|---|---|
| 11,761,447 B1 * | 9/2023 | Tofte | F04D 15/0254 | 417/279 |
| 2004/0181349 A1 * | 9/2004 | Tynkov | F22B 35/18 | 702/55 |
| 2008/0173371 A1 * | 7/2008 | Wyper | F16K 17/192 | 141/59 |
| 2009/0064698 A1 * | 3/2009 | Spanger | F24F 13/222 | 62/289 |
| 2013/0105002 A1 * | 5/2013 | Enos | B01L 7/02 | 137/334 |
| 2013/0108478 A1 * | 5/2013 | Parkinson | F04B 49/02 | 417/53 |
| 2017/0145666 A1 * | 5/2017 | Kochan, Jr. | E03B 5/02 | |
| 2018/0180310 A1 * | 6/2018 | Abel | H01H 35/18 | |
| 2019/0353156 A1 * | 11/2019 | Ward | F04B 49/065 | |
| 2024/0045397 A1 * | 2/2024 | Jensen | G01F 23/363 | |
| 2024/0058845 A1 * | 2/2024 | Son | B08B 13/00 | |

FOREIGN PATENT DOCUMENTS

| | | |
|---|---|---|
| CN | 103041954 A | 4/2023 |
| CN | 219226228 U | 6/2023 |
| WO | WO-0128950 A1 | 4/2001 |

* cited by examiner

*Primary Examiner* — Howard Cortes

(74) *Attorney, Agent, or Firm* — Sterne, Kessler, Goldstein & Fox P.L.L.C.

(57) ABSTRACT

The present disclosure describes a system configured to prevent a false low water alarm in a semiconductor processing system. The system includes a liquid reservoir configured to hold a liquid and a sensor system configured to delay an alarm for a predetermined duration of time. In some embodiments, the sensor system includes a sensor configured to determine a level of the fluid in the liquid reservoir and send a signal indicating the level of the fluid to an alarm system and a delay circuit coupled to the fluid level sensor and configured to delay the signal to the alarm system for the predetermined duration of time.

20 Claims, 7 Drawing Sheets

WATER LEVEL SENSOR ALARM

BACKGROUND

During semiconductor fabrication processes that require water use, sudden changes in the water level can cause equipment malfunctions. Equipment malfunctions can lead to significant losses in both product and production (e.g., worker hours repairing equipment and replacing defective equipment). As a result, the cost of semiconductor fabrication processes can increase.

BRIEF DESCRIPTION OF THE DRAWINGS

Aspects of the present disclosure are best understood from the following detailed description when read with the accompanying figures.

DETAILED DESCRIPTION

Figure 1:
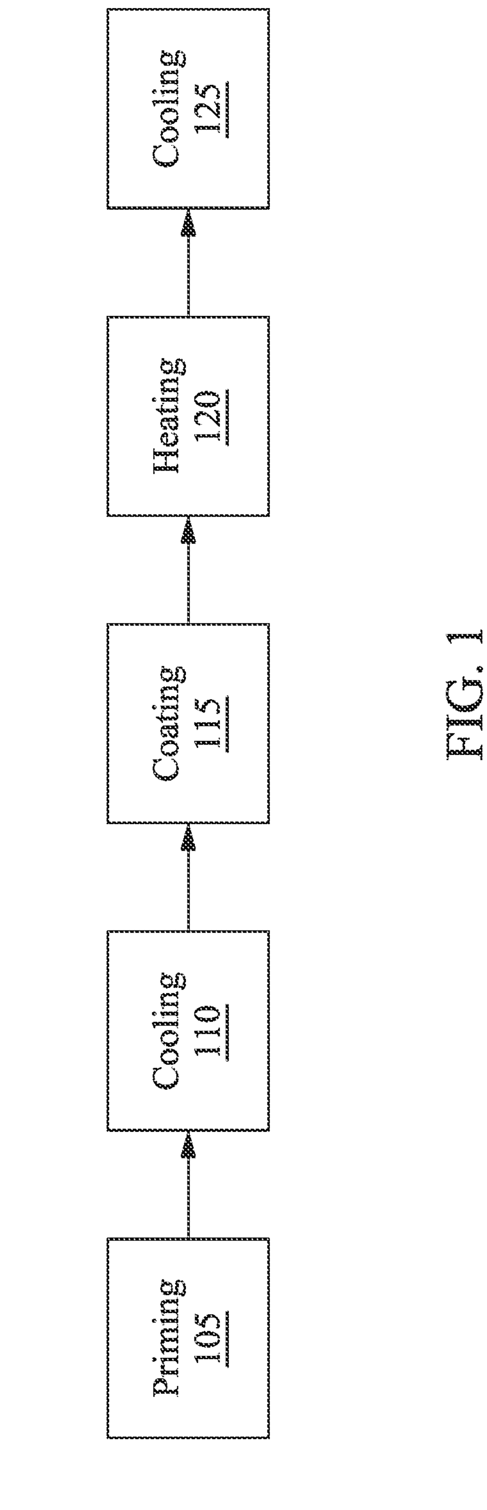
FIG. 1 is a flowchart for a semiconductor process utilizing stored water, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments of the present disclosure, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

As used herein, the meaning of "a," "an," and "the" includes singular and plural references unless the context clearly dictates otherwise.

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination or A, B, and C in combination.

The embodiments described herein are directed to a system configured to prevent a false low water alarm in a system temperature and humidity control (STHC) system. The system includes a liquid reservoir configured to hold a liquid and a sensor system configured to delay an alarm for a predetermined duration of time. In some embodiments, the sensor system includes a sensor configured to determine a level of the fluid in the liquid reservoir and send a signal indicating the level of the fluid to an alarm system and a delay circuit. For example, the signal can be a low fluid level event signal. The delay circuit is coupled to the fluid level sensor and configured to delay the signal to the alarm system for the predetermined duration of time.

In some embodiments, the liquid can be chosen from any of a cooling liquid, a heat transfer liquid, a lubricating liquid, a coating liquid, or any liquid suitable for semiconductor processing. For example, the liquid can be water to maintain the humidity levels in a semiconductor process tool or a cooling liquid to provide process cooling for either the semiconductor process tool and/or the product. In some embodiments of the present disclosure, the liquid can be any one of water, oil, an emulsion, a super-cooled liquid, or a combination thereof.

The fluid level sensor system can be incorporated into a fluid storage tank (for example, a water tank), in some embodiments of the present disclosure. In some embodiments of the present disclosure, the fluid storage tank is configured to supply water to a chilled water system and/or a humidifier system. In some examples, the chilled water system and/or the humidifier system are flowably coupled to a semiconductor process tool to maintain process parameters such as, for example, temperature and humidity.

In some embodiments of the present disclosure, the fluid level sensor system can be configured to initiate a shutdown protocol associated with a processing system if a sudden drop in the fluid level (for example, a water level) is detected. In some embodiments of the present disclosure, the shutdown protocol is employed to protect the processing system from damage. In some embodiments of the present disclosure, a processing system that relies on chilled water for its function can become damaged if the chilled water is suddenly not flowing to the processing system. For example, cooled parts of the processing system can overheat, burn out, or warp if a certain temperature is not maintained.

In some cases, the water level drop can be a reaction to the fluid storage tank moving for any one of a variety of reasons. For example, the fluid storage tank can move or shake during an earthquake, because of operator error, and/or severe weather. As a result, the processing system shut down may be unwarranted and cause unnecessary damage to one or more of a product undergoing processing by the processing system and the processing system itself. Further, the unnecessary damage to the processing system can incur additional costs in the form of worker hours expended to repair the processing system.

In some embodiments of the present disclosure, the processing system can be a semiconductor fabrication processing system that requires water for some aspect of its operation. For example, the processing can require water for cooling and/or water for humidity control. In some embodiments of the present disclosure, the cooling can be directed to the processing system itself, a related tool, or the product undergoing processing by the processing system. For example, a processing system requiring chilled water can be a cryogenic vacuum pump helium compressor. A related tool can be a quartz crystal thin film deposition thickness monitor. In some embodiments of the present disclosure, the product is a silicon wafer requiring a cooling operation after a baking operation.

In some embodiments of the present disclosure of the present disclosure, certain semiconductor processing tools can be adversely affected by natural phenomena. For example, a power outage caused by a severe storm can shut down all or at least part of a semiconductor fabrication facility. A flood can be devastating to a clean room and the semiconductor process tools contained therein. An earthquake can disrupt the operations of semiconductor process tools.

In some embodiments of the present disclosure, even a small magnitude earthquake can be disruptive to semiconductor process tools in a semiconductor fabrication facility. For example, a mask alignment process can be disrupted by an earthquake, causing the mask to be misaligned. Such a mask misalignment can be detrimental to any downstream processing. Clean room high efficiency particulate air (HEPA) filters can become dislodged during an earthquake, allowing particulate contamination to adversely affect smaller semiconductor device features.

FIG. 1 is a flowchart showing an example process flow 100 for silicon wafer processing preparation, according to some embodiments of the present disclosure. During a priming operation 105, a primer material, such as hexamethyldisilazane (HDMS), is deposited onto a wafer (for example, by spin-casting). After the spin-casting operation, the wafer is subjected to a cooling operation 110 (for example, by placing the wafer onto a cooling plate).

In some embodiments of the present disclosure, the cooling plate can be flowably connected to a chilled water system. For example, a chilled water system can include supply and return lines (running both from a water source and to/from the cooling plate), a liquid reservoir, a pump, a cooling unit, and various monitoring sensors.

For example, the chilled water system can include temperature sensors, water flow sensors, and water pressure sensors. Also, a liquid reservoir of the chilled water system can include water level sensors. In some embodiments, the water level sensors inside the liquid reservoir can be electrically coupled to an alarm system configured to alert a semiconductor process tool user and/or a semiconductor process tool technician that the water level has decreased below a threshold level employed to protect the semiconductor process tool (for example, the cooling plate) from deleterious events. For example, overheating can result in loss of a product being processed by the semiconductor process tool, damage to the semiconductor process tool (for example, burn out, warping, electronic failure, or the like), worker hours required to repair or replace the semiconductor process tool, and affects to downstream processing tools. For example, a hot wafer (in other words, a non-cooled wafer) can damage a wafer loading station, a wafer unloading station, a robotic wafer handling system, a vacuum chuck (for example, an O-ring positioned within a vacuum chuck to secure the wafer during processing), or any other thermally vulnerable processing and/or wafer handling apparatus.

In some embodiments, at operation 115, a wafer can be coated with a thin film for a variety of reasons. For example, a functional thin film can be coated onto the wafer to create a horizontal electrical interconnect. In other examples, a sacrificial thin film can be coated onto the wafer to protect device features from downstream processing. In some embodiments, the coating apparatus can require chilled water from the chilled water system to cool down moving parts. In some embodiments, the coating apparatus can require humidity control within a coating chamber to control the thin film deposition. For example, a spin-cast thin film can require higher humidity for a hydrated thin film, or the spin-cast thin film can require very low humidity for fast drying.

In some embodiments, at operation 120, a heating system (for example, a hot plate, an oven, or a vacuum oven) can require chilled water from the chilled water system for safe operation. Chilled water can be used by the heating system to maintain a safe temperature for parts of the heating system that are outside of the heating chamber and/or heating plate. For example, the electronics controlling the heating system can be cooled by the chilled water system to extend the cycle lifetime of the heating system's electronics. Further, the chilled water from the chilled water system can be used to control the temperature of the heating chamber and/or the heating plate.

In some embodiments, at operation 125, a cooling system can be employed to cool the wafer after going through the heating operation 120. Cooling lines carrying the chilled water from the chilled water system can be used to carry heat away from a heat sink supporting the hot wafer. For example, the hot wafer can be placed on an aluminum cooling plate flowably connected to the chilled water lines such that the chilled water can absorb and carry the heat away from the wafer.

Figure 2:
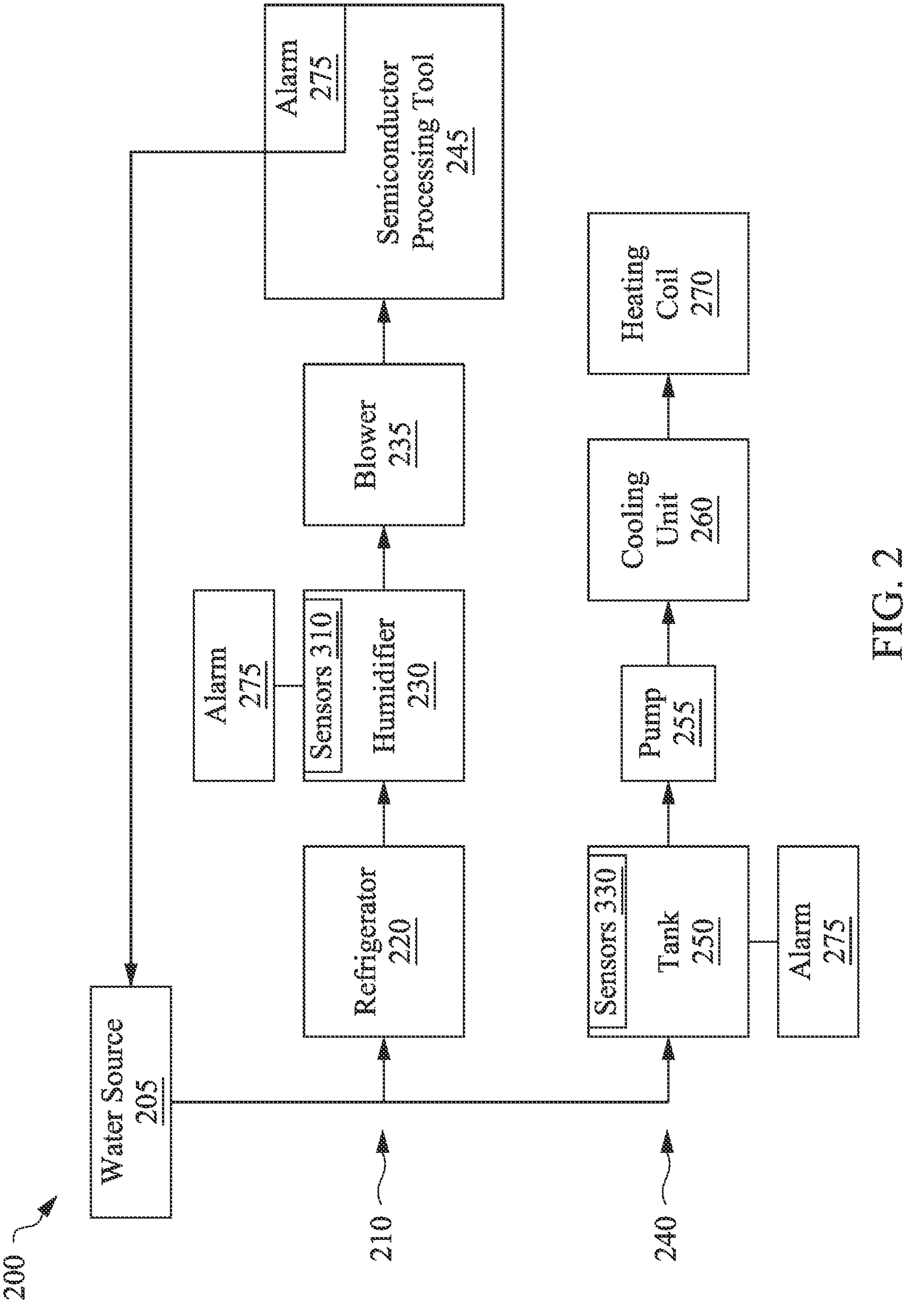
FIG. 2 is a block diagram depiction of a water supply system, in accordance with some embodiments.

Referring now to FIG. 2, a block diagram of a water supply system 200 is shown, according to some embodiments of the present disclosure. In some embodiments of the present disclosure, the water supply system 200 can be a system temperature and humidity control (STHC) system. For example, the STHC system can be configured to control either temperature or humidity in a semiconductor process tool, temperature and humidity in a semiconductor process tool, temperature in a first semiconductor process tool and humidity in a second semiconductor process tool, temperature in a plurality of semiconductor process tools, humidity in a plurality of semiconductor process tools, temperature and humidity in a plurality of semiconductor process tools, or any combination where either one of temperature and/or humidity need to be controlled in any exemplary semiconductor process tool.

FIG. 2 depicts a humidifier system 210 and a chilled water system 240. Turning now to the humidifier system 210 example shown in FIG. 2, process water can flow from a water source 205 into the humidifier system 210 and enter a refrigeration unit 220. The refrigeration unit 220 can cool the process water to a temperature suitable for storage and processing by a humidifier unit 230. The humidifier unit 230 can be configured to heat and vaporize the process water, and the blower 235 can urge the vaporized water into a semiconductor processing tool 245. The semiconductor processing tool 245 can be, for example, a cooling plate, an epitaxial growth furnace, a reactive ion etch tool, an evaporator, a sputterer, a quartz crystal thin film thickness monitor, a vacuum pump, or the like. In some embodiments, the humidifier unit 230 can include a variety of several sensors, for example, water level sensors. Water level sensors in the humidifier unit 230 can serve multiple purposes.

Figure 3B:
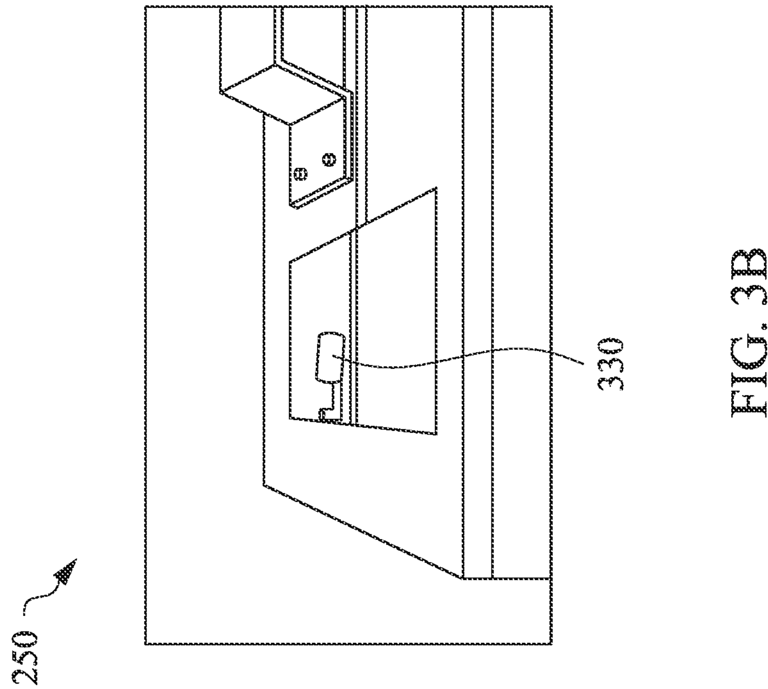
FIGS. 3A and 3B are illustrations of sensor positions, in accordance with some embodiments.
Figure 3A:
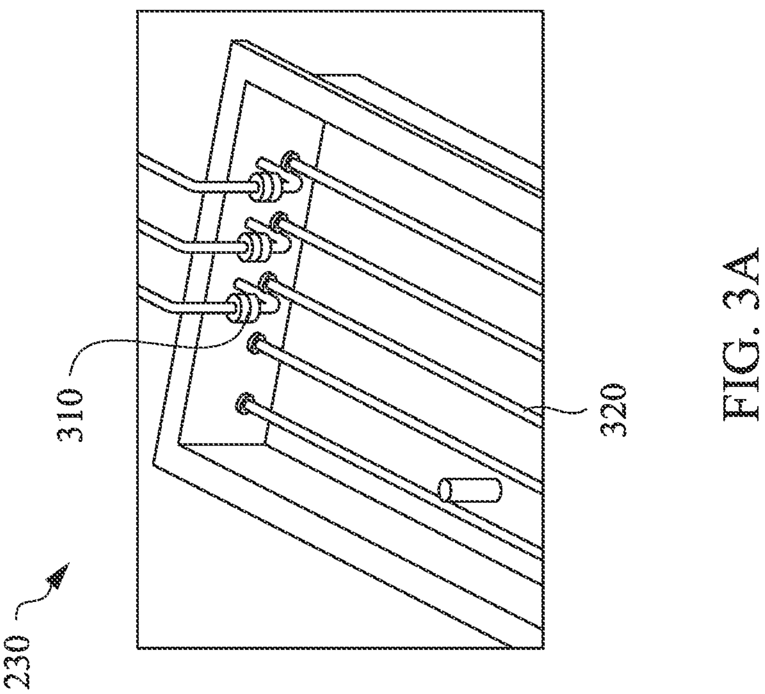

FIG. 3A is an illustration showing water level sensor 310 placement within the humidifier unit 230. First, in some embodiments of the present disclosure, the water level sensors 310 shown in FIG. 3A can relay water level information to a system configured to maintain a predetermined water level in the humidifier unit 230 to ensure adequate fluid content (for example, adequate water content in the humidifier unit 230). In some embodiments of the present disclosure, the water level sensors 310 can be configured to relay a low water notification to an alarm system 275, as shown in FIG. 2.

In some embodiments of the present disclosure, the alarm system 275 can be configured to shut down the semiconductor processing tool 245 relying on the humidifier system 210 to operate. In some embodiments of the present disclosure, such a shutdown can have detrimental effects on the semiconductor processing tool 245. For example, product being process by the semiconductor processing tool 245 may need to be scrapped, the semiconductor processing tool 245 itself can require maintenance prior to restarting, and worker and/or technician time may have to be unnecessarily consumed in order to bring the semiconductor processing tool 245 back online.

In some embodiments, the alarm system 275 can be triggered by receiving two consecutive low fluid level signals (for example, two low water level signals) from the water level sensors 310. For example, the water level sensors 310 can send a first low water level signal to the alarm system 275 initiating a triggering event. After a time duration of from about 4 seconds to about 60 seconds, if the water level sensors 310 still read a low water level, the water level sensors 310 can transmit a second consecutive low water level signal to the alarm system 275. In some embodiments, if the alarm system 275 receives the second consecutive low water level signal from the water level sensors 310, the alarm system 275 is triggered and the semiconductor processing tool 245 can be shut down. On the other hand, if the alarm system 275 does not receive a second low water level signal from the water level sensors 310, the alarm system 275 will not trigger. Moving forward, the two consecutive low water level signal transmissions will be referred to as the "low fluid (water) level event signal."

Referring back to FIG. 2, the water supply system 200 is shown with a chilled water system 240. As shown in FIG. 2, process water can flow into the chilled water system 240 from the water source 205 and enter a tank 250. The tank 250 can hold the process water prior to supplying the water to a cooling unit 260 through a pump 255. The chilled water can be pumped through the cooling unit 260 and through a heating coil 270. In some embodiments, the heating coil 270 can be used to optimize the temperature of the chilled water. After the temperature of the chilled water is optimized, the chilled water can be supplied to the semiconductor processing tool 245. Water level sensors 330 in the tank 250 can serve multiple purposes.

FIG. 3B is an illustration showing water level sensor 330 placement within the tank 250. In some embodiments of the present disclosure, the water level sensors 330 can relay water level information to a system configured to maintain a certain water level in the tank 250. In some embodiments of the present disclosure, the water level sensors 330 can be configured to relay a low water notification to the alarm system 275 (of FIG. 2). The alarm system 275 can be configured to shut down a semiconductor processing tool 245 relying on the chilled water system 240 to operate. Such a shutdown can have detrimental effects on the semiconductor processing tool 245. For example, product being process by the semiconductor processing tool 245 may need to be scrapped, the semiconductor processing tool 245 itself can require maintenance prior to restarting, and worker and/or technician time may have to be unnecessarily consumed in order to bring the processing system back online.

As shown in FIG. 3A, the water level sensors 310 deployed in the humidifier unit 230 can be positioned at a point sufficient to maintain the water level such that the heating coils 320 remain submerged. In some embodiments of the present disclosure, when the heating coils 320 are active and a load is removed (for example, there is no water in contact with the heating coils 320), the heating coils 320 can overheat, causing damage to the humidifier unit 230. For example, an overheated heating coil 320 can warp, resulting in a malfunction requiring either a repair or a replacement. Likewise, in FIG. 3B, the water level sensors 310 deployed in the tank 250 can be positioned in the tank 250 such that the water level is maintained at a level sufficient to ensure that the semiconductor process tool 245 receiving chilled water from the chilled water system 240 receives a constant flow of chilled water.

In some embodiments of the present disclosure, the water level sensors 310 can be coupled to a timing system configured to evaluate the duration of time of a low water event. In some embodiments, a low water event can be indicated when at least one water level sensor 310 is exposed to air and is not in contact with water. For example, when a low water event having a duration of about 1 second is detected, the alarm system can trigger, resulting in a shutdown of the semiconductor processing tool 245. In some embodiments of the present disclosure, a low water level event lasting for a duration of about 1 second may not be indicative of a catastrophic low water level event. For example, water moving during an earthquake can leave the water level sensors 310 exposed for a long enough period of time to indicate a false low water level event.

Figure 4A:
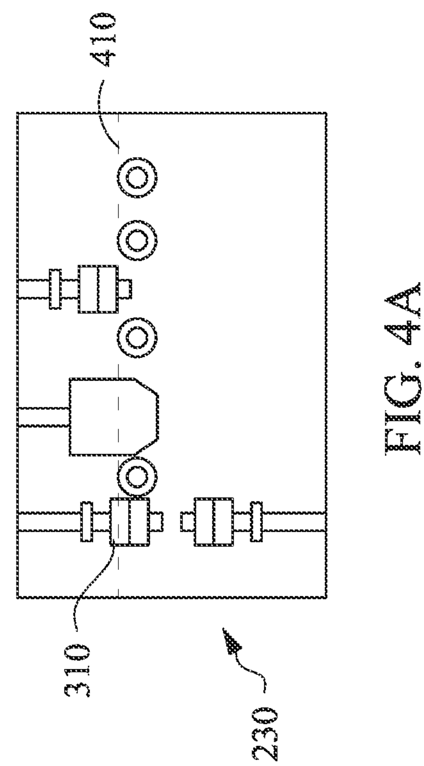
FIGS. 4A, 4B, 4C, and 4D are illustrations showing water level variation in a reservoir, in accordance with some embodiments.
Figure 4B:
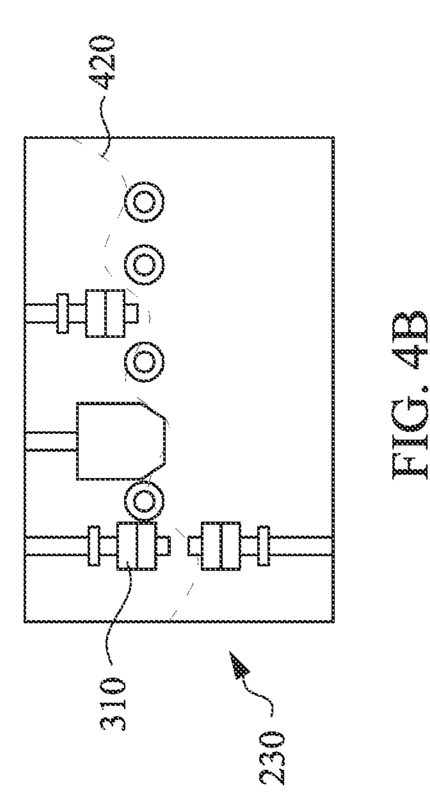

FIGS. 4A, 4B, 4C, and 4D are illustrations showing the effect of, for example, an earthquake on the water level movement in the water supply system 200. FIG. 4A shows the humidifier unit 230 under normal conditions, for example, when an earthquake is not occurring. Under normal conditions, the water level is static and level as indicated by a horizontal dashed line 410. FIG. 4B illustrates the humidifier unit 230 during an earthquake event. In some embodiments, the humidifier unit 230 can shake, in some cases violently, during an earthquake causing severe fluctuations in the water level in the humidifier unit 230, as indicated by a wavy dashed line 420. Notably, the water level during the earthquake event indicated by the wavy dashed line 420 can fluctuate significantly enough to leave the water level sensors 310 exposed to air for long enough to trigger the 1 second alarm in the alarm system 275.

Figure 4C:
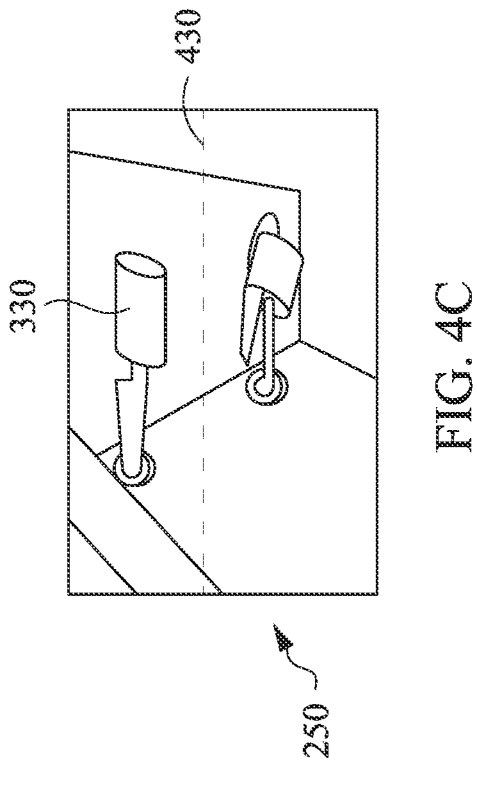
Figure 4D:
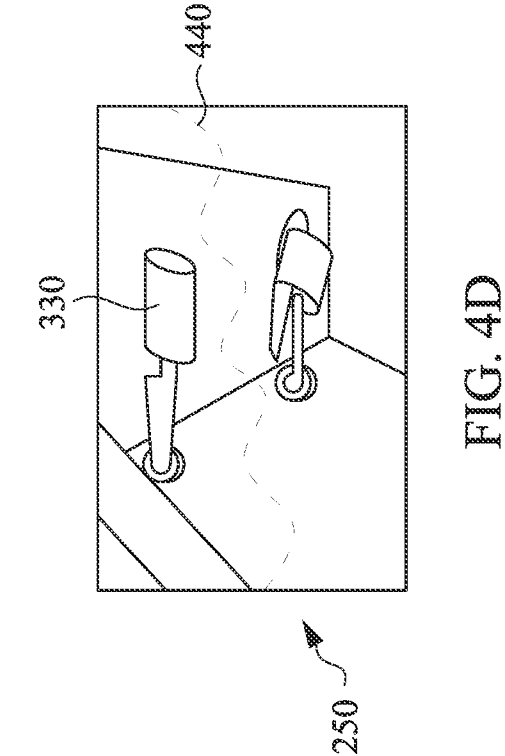

FIG. 4C shows the tank 250 in the chilled water system 240 under normal conditions, for example, when an earthquake is not occurring. Under normal conditions, the water level is static and level as indicated by the horizontal dashed line 430. FIG. 4D illustrates the tank 250 during an earthquake event. In some embodiments, the tank 250 can shake during an earthquake causing severe fluctuations in the water level within the tank 250, as indicated by a wavy dashed line 440. Notably, the water level during the earthquake event indicated by the wavy dashed line 440 can fluctuate significantly enough to leave the water level sensors 330 exposed to air for long enough to trigger the 1 second alarm in the alarm system 275.

In some embodiments, a second liquid level sensor 330 can be positioned substantially level with the first liquid level sensor 330 in the tank 250. Likewise, two liquid level sensors 310 can be positioned substantially level with one another in the humidifier unit 230. As shown in FIG. 3A, the water level sensors 310 deployed in the humidifier unit 230 can be positioned at a point sufficient to maintain the water level such as the heating coils 320 remain submerged. Thus, a redundant sensor system is provided to further protect the semiconductor process tool from damage, protect product from being scrapped, and save worker hours from unnecessary repair or replacement.

In some embodiments of the present disclosure, before the fluctuating water level can return to be sensed by the water level sensors 310, the alarm system 275 can already be triggered, resulting in a false alarm. For example, if the water level starts fluctuating, the water can rise and fall over the water level sensors 310. As such, the water level sensors 310 can sense water during the crest of a wave and can sense water loss during the trough of a wave. In some embodiments of the present disclosure, if the trough of the wave lasts for longer than 1 second, the alarm system 275 can trigger. As the water level is merely fluctuating, water is still present in the humidifier unit 230, and the low water alarm triggered by the alarm system 275 is false. Embodiments of the present disclosure address this false alarm.

Figure 5A:
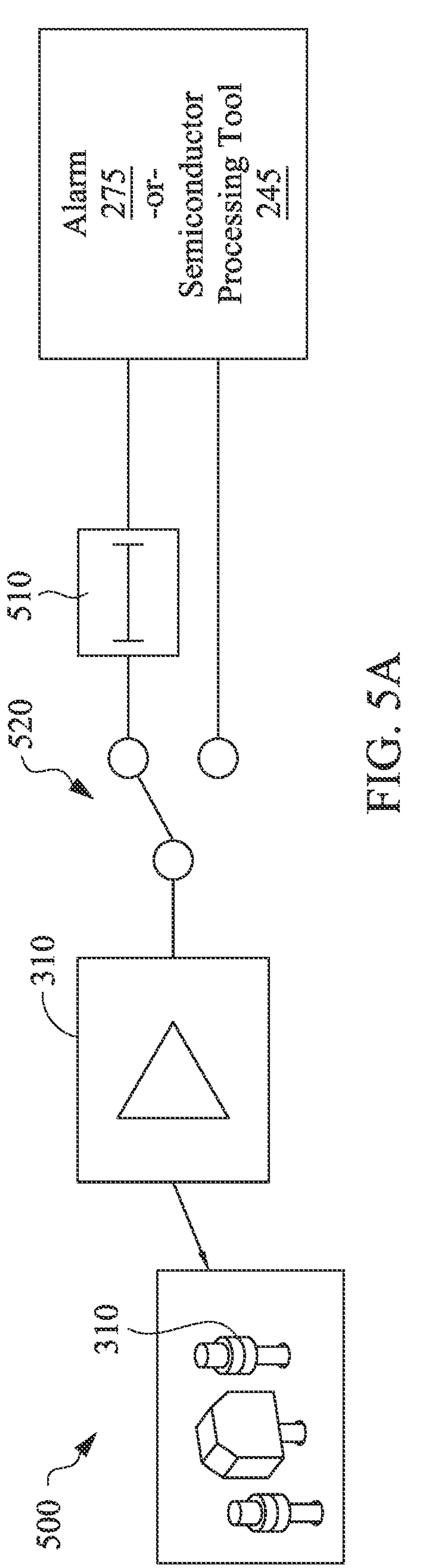
FIGS. 5A and 5B depict a false low water alarm prevention system, in accordance with some embodiments.

FIG. 5A is a schematic showing a false alarm prevention system 500, according to some embodiments. In some embodiments of the present disclosure, the false alarm prevention system 500 can be configured to alleviate the occurrence of a false alarm in the humidifier system 210. In some embodiments of the present disclosure, a delay circuit 510 can be electrically coupled to the water level sensors 310. For example, the delay circuit 510 can be configured to delay a signal sent from the water level sensors 310 to the alarm system 275. Accordingly, in the event of an earthquake or any other cause for the water level to fluctuate within the humidifier unit 230, a false alarm can be prevented by delaying the signal sent from the water level sensors 310 to the alarm system 275.

In some embodiments of the present disclosure, a switch 520 can be configured to switch from sending the signal sent from the water level sensors 310 to the alarm system 275 and/or the semiconductor processing tool 245 itself over to sending the water level sensor signal directly to the delay circuit 510. In some embodiments of the present disclosure, the switch 520 can be configured to trigger after a low water event signal persists for up to about 1 second (for example, about 0.99 second), activating the switch 520. Thus, the low water event signal can be diverted from the alarm system 275 (or the semiconductor processing tool 245 having the alarm system 275) to the delay circuit providing a timing buffer for the water level sensing system to return to a default configuration without triggering a false alarm and unnecessarily shutting down the semiconductor processing tool 245.

Figure 5B:
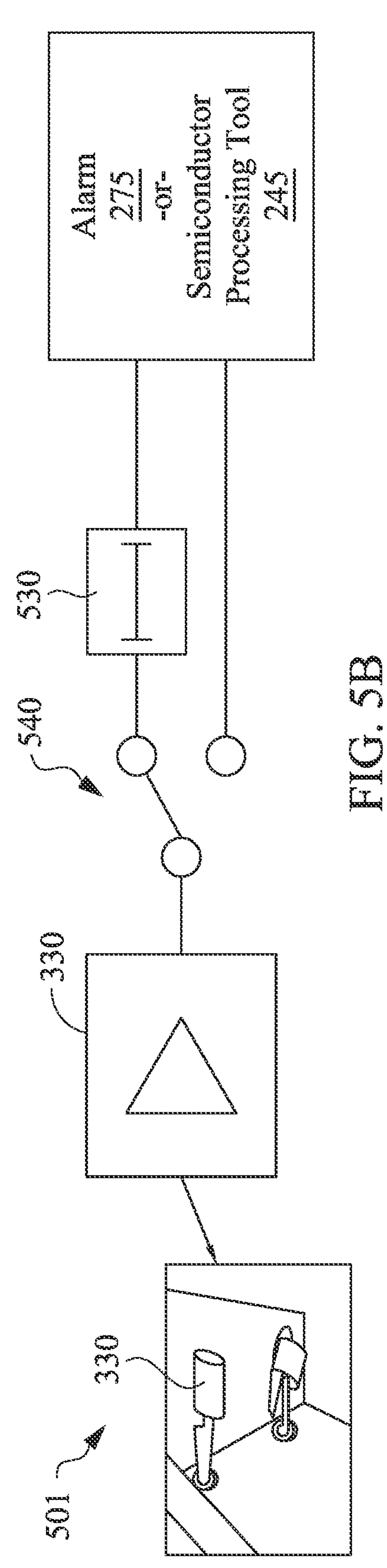

In some embodiments of the present disclosure, FIG. 5B illustrates a false alarm prevention system 501 configured to alleviate a false alarm in the chilled water system 240. In some embodiments of the present disclosure, a delay circuit 530 can be electrically coupled to the water level sensors 330. For example, the delay circuit 530 can be configured to delay a signal sent from the water level sensors 330 to the alarm system 275. Accordingly, in the event of an earthquake or any other cause for the water level to fluctuate within the tank 250, a false alarm can be prevented by delaying the signal sent from the water level sensors 330 to the alarm system 275. Additionally, a switch 540 can be configured to switch from sending the signal sent from the water level sensors 330 to the alarm system 275 and/or the semiconductor processing tool 245 itself over to sending the water level sensor signal directly to the delay circuit 530 (for example, the switch 540 can be activated).

Figures 6A, 6B, 6C:
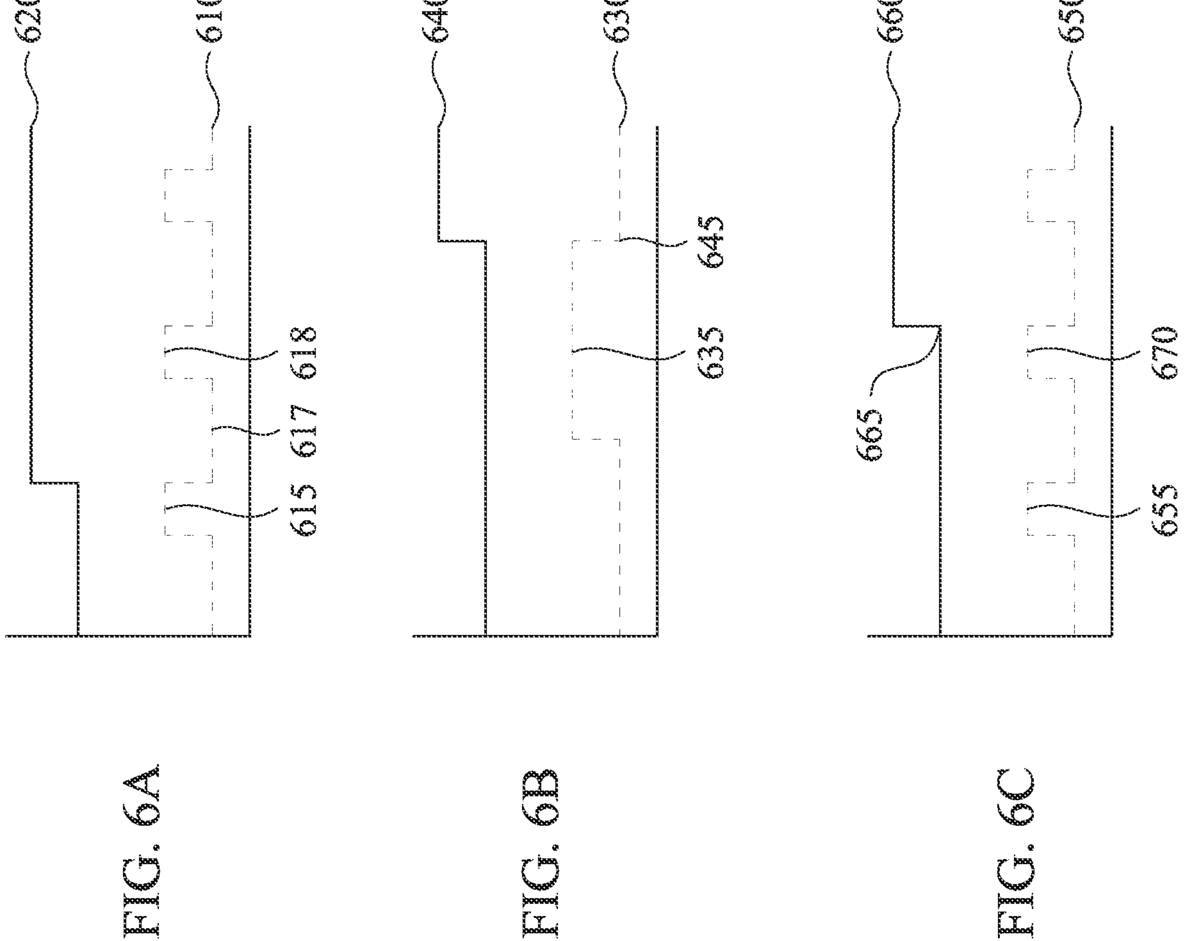
FIGS. 6A, 6B, and 6C are graphical depictions of a signal delay, in accordance with some embodiments.

FIGS. 6A, 6B, and 6C are graphical depictions of delaying the signal sent from the water level sensor 310 to the alarm system 275 and/or the semiconductor processing tool 245 having an integrated alarm system 275, according to some embodiments of the present disclosure. In some embodiments, a water level sensor system without the false alarm prevention system 500, 501 is configured to detect a water level every second for a first time duration (e.g., about 1 second). For example, FIG. 6A shows a default operation indicated by a plot line 610, where the water level sensor system can activate (in other words, sense) for about a 1 second duration as indicated by a sense interval 615, deactivate (in other words, rest) for about 1 second as indicated by a rest interval 617, and then reactivate (sense) for about another 1 second duration as indicated by a sense interval 618. Accordingly, in some embodiments, when no water is sensed after the 1 second duration, the alarm system 275 can activate as indicated by the plot line 620 corresponding to the end of the first 1 second sense interval 615 and shut down the semiconductor processing tool 245.

In some embodiments, when the false alarm prevention system 500, 501 is employed, the sensor signal, and in turn the sensor detection rate, can be delayed by a second time duration—longer than the first time duration—before it is transmitted to the alarm system 275 and/or the semiconductor processing tool 245 having the integrated alarm system 275. In some embodiments, the second time duration can range from about 4 seconds to about 60 seconds. If there is no water detected after the second time duration (for example, a predetermined value falling within the range of about 4 seconds to about 60 seconds), the signal is transmitted to the alarm system 275 and/or the semiconductor processing tool 245 having the integrated alarm system 275.

In some embodiments, the low water level event signal can be tailored to a particular water supply system 200. For example, the second time duration can be optimized for a highly sensitive system and/or a more robust system. In some embodiments, the highly sensitive system can require stringent control over a water supply system 200. Accordingly, the second time duration can be a short time duration, for example, from about 4 seconds to about 10 seconds. In some embodiments, the more robust system can be protected from a false alarm using a longer second time duration. For example, the robust system can be less susceptible to a low water event and only need a second time duration of from about 30 seconds to about 60 seconds. In some embodiments, the false alarm prevention system 500, 501 can be customized to a particular application.

For example, FIG. 6B graphically shows an implementation of the false alarm prevention system 500, 501. In FIG. 6B, the sensor signal, indicated by a plot line 630, includes a signal delay indicated by a delayed sense interval 635. In some embodiments, the delayed sense interval 635 can be extended from the 1 second default sense interval 615 depicted in FIG. 6A to a second delayed sense interval 635 (for example, about 4 seconds to about 60 seconds). After a maximum delayed sense time 645 is reached, the alarm system 275 can activate as indicated by a plot line 640 corresponding to the end of the delayed sense interval 635 and shut down the semiconductor processing tool 245.

Additionally, in some embodiments of the present disclosure, the false alarm prevention system 500, 501 can revert back to a default operation where the water level sensor system can activate (in other words, sense) for about a 1 second duration, deactivate (in other words, rest) for about 1 second, and then reactivate (sense) for about another 1 second duration. In some embodiments, the false alarm prevention system 500, 501 can revert to default operation after the alarm system 275 triggers a low water level alarm. For example, the reversion can occur after an alarm triggering event occurring after the signal delay event. In some embodiments, if no water is detected after the maximum signal delay (for example, after about 4 seconds to about 60 seconds), the signal is transmitted to the alarm system 275 and/or the semiconductor processing tool 245 having the integrated alarm system 275.

The alarm system 275 can trigger the low water level alarm and proceed to shutting down the semiconductor processing tool 245. Referring to FIG. 5, the switch 520, 540 can be configured to switch from sending the signal sent from the water level sensors 310, 330 to the delay circuit 520, 540 back to sending the water level sensor signal directly to the alarm system 275 and/or the semiconductor processing tool 245 having the integrated alarm system 275 itself (for example, the switch 520, 540 can be deactivated). Thus, an unnecessary shut down can be avoided, and a necessary shut down can be implemented when a catastrophic low water event occurs.

Referring to FIG. 6C, this graphic depicts the false alarm prevention system reverting back to the default operation. Notably, a plot line 660 indicating the alarm system 275 activation at point 665 depicts the default operation. If water is sensed by the water level sensor 310, 330, the alarm system 275 will not trigger after a 1 second sense interval 655. However, if no water is sensed during a later sense interval 670, the alarm system 275 can trigger, or in some embodiments, the false alarm prevention system 500, 501 will assume control of the signal, beginning the delay cycle anew.

In some embodiments of the present disclosure, referring to FIG. 5, the delay circuit 510, 530 can increase the alarm trigger time from a first time duration (for example, about 1 second) to a second time duration longer than the first time duration (for example, from about 4 seconds to about 60 seconds). This increased duration of time before sending a low water level signal to the alarm system can allow any fluid motion to subside, for example, the normal conditions depicted in FIGS. 4A and 4C, such that the water level sensors 310, 330 can detect the correct water level. In some embodiments of the present disclosure, a low water event lasting for more than the second time duration (for example, about 4 seconds to about 60 seconds) can be indicative of a catastrophic low water event. Accordingly, delaying the low water signal transmission from the water level sensors 310 to the alarm system for a duration of time greater than the second time duration can be hazardous for the processing system and/or the product.

Figure 7:
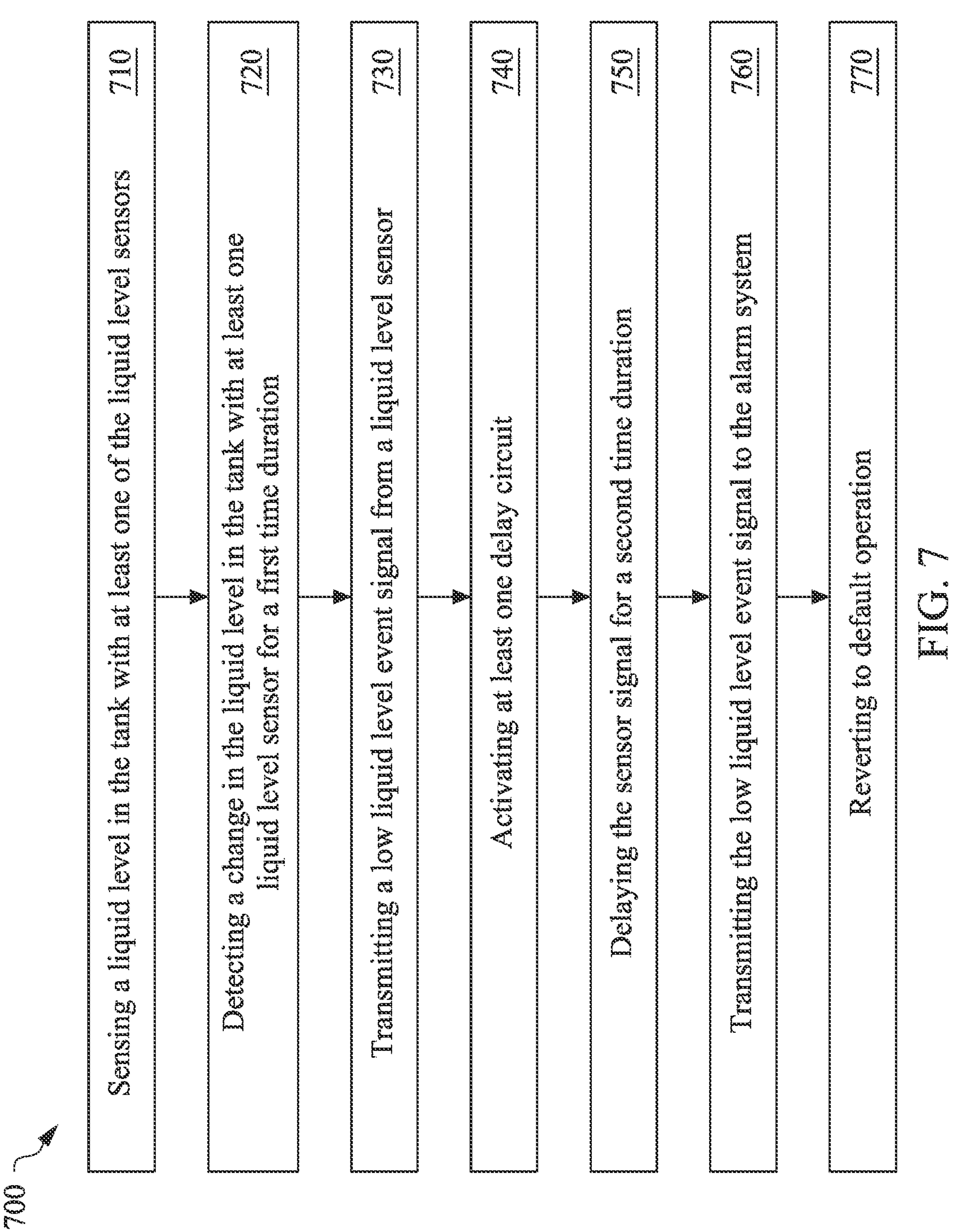
FIG. 7 is a flowchart for a method of employing a false alarm prevention system, in accordance with some embodiments.

Turning now to FIG. 7, a method 700 of employing the false alarm prevention system 500, 501 of FIGS. 5A and 5B is depicted, according to some embodiments of the present disclosure. The operations depicted in the method 700 can be performed by, for example, water supply system 200 of FIG. 2. It is to be appreciated that not all operations may be needed to perform the disclosure provided herein and that one or more additional operations may be performed. Further, some of the operations may be performed concurrently or in a different order than shown in method 700.

In some embodiments of the present disclosure, at operation 710, the method of deploying and employing the false alarm prevention system 500 can include sensing a liquid level in the tank with at least one of the liquid level sensors 310, 330. In some embodiments of the present disclosure, the sensing operation can be configured to determine if water is in contact with the water level sensor 310, 330. If water is in contact with the water level sensor 310, 330, the system continues the default operation. In some embodiments of the present disclosure, default operation includes determining if water is in contact with the water level sensor 310, 330 at a predetermined time interval such as, for example, every about 1 second, as depicted in FIG. 6A or 6C.

If no water is in contact with the water level sensor 310, 330 for a first time duration (for example, up to about 1 second such as, about 0.99 second), at operation 720, the method of deploying and employing the false alarm prevention system 500, 501 can include detecting a change in the water level in the humidifier unit 230 or the tank 250 with at least one water level sensor 310, 330 for up to the first time duration. After detecting a change in the water level, at operation 730, at least the one water level sensor 310, 330 can be configured to transmit a low liquid event signal (for example, a low water level event signal) to the false alarm prevention system 500, 501 according to some embodiments. In some embodiments, the switch 520, 540 can then activate and divert the low water event signal being sent from the water level sensor 310, 330 from being transmitted to the alarm system 275 and/or the semiconductor processing tool 245 having an integrated alarm system 275 over to the delay circuit 510, 530.

In some embodiments of the present disclosure, at operation 740, the method of employing the false alarm prevention system 500, 501 can include activating at least one delay circuit 510, 530. In some embodiments, at operation 750, the delay circuit 510, 530 can delay the low water event signal sent from the water level sensor 310, 330 to the alarm system 275 and/or the semiconductor processing tool 245 having an integrated alarm system 275 for a second time duration longer than the first time duration (for example, ranging from about 4 seconds to about 60 seconds). After the second time duration is reached (for example, between about 4 seconds and about 60 seconds), and if the water level sensor 310, 330 still reads a low water event signal, at operation 760, the low water event signal from the water level sensor 310, 330 is transmitted to the alarm system 275 and/or the semiconductor processing tool 245 having an integrated alarm system 275 and the low water level alarm can trigger. Additionally, at operation 770, in some embodiments of the present disclosure, after the maximum predetermined duration of time is reached, the switch 520, 540 can revert to sending the signal from the water level sensor 310, 330 directly to the alarm system 275 and/or the semiconductor processing tool 245 having an integrated alarm system 275, and resume determining if water is present on the water level sensor 310, 330 based on the first time period (for example, up to about 1 second intervals).

In some embodiments of the present disclosure, a system can be configured to prevent a false low water alarm in a system temperature and humidity control (STHC) system. The system includes a liquid reservoir configured to hold a liquid and a sensor system configured to delay an alarm system for a predetermined duration of time. In some embodiments, the sensor system includes a sensor configured to determine a level of the fluid in the liquid reservoir and send a signal indicating the level of the fluid to the alarm system and a delay circuit coupled to the fluid level sensor and configured to delay the signal to the alarm system for the predetermined duration of time.

In some embodiments of the present disclosure, at least a first fluid level sensor can be positioned in a liquid reservoir at a predetermined level to ensure adequate fluid content. A first delay circuit can be communicably coupled to the first fluid level sensor and configured to delay a first signal from the first fluid level sensor from being transmitted to an alarm system, where the first signal is a low fluid level event signal. In some embodiments, a second fluid level sensor positioned substantially level with the first fluid level sensor along with a second delay circuit communicably coupled to the second fluid level sensor and configured to delay a second signal from the second fluid level sensor from being transmitted to the alarm system, where the second signal is a low fluid level event signal, where the first fluid level sensor and first delay circuit and the second fluid level sensor and the second delay circuit comprise a redundant sensor system.

In some embodiments of the present disclosure, a method includes sensing a liquid level in a tank with at least one liquid level sensor, detecting a change in the liquid level in the tank with at least one liquid level sensor for a first period of time, transmitting a low liquid level event signal from the liquid level sensor, activating at least one delay circuit, delaying the low liquid level event signal for a second period of time.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A system, comprising:

a liquid reservoir configured to hold a liquid;

a sensor system configured to send an alarm signal to a semiconductor processing tool, the sensor system comprising:

a fluid level sensor configured to determine a level of the fluid in the liquid reservoir and to send the alarm signal to the semiconductor processing tool, wherein the alarm signal indicates the level of the fluid; and a delay circuit coupled to the fluid level sensor and configured to delay the alarm signal to the semiconductor processing tool for a predetermined duration of time; and a switch configured to switch between sending the alarm signal to the semiconductor processing tool and to the delay circuit, wherein the semiconductor processing tool is configured to shut down in response to the alarm signal indicating a low fluid level.

2. The system of claim 1, wherein the fluid level sensor is a first fluid level sensor, further comprising a second fluid level sensor.

3. The system of claim 2, wherein the delay circuit is a first delay circuit, further comprising a second delay circuit communicably coupled to the second fluid level sensor.

4. The system of claim 1, wherein the semiconductor processing tool has a fluid level alarm system.

5. The system of claim 3, wherein the second fluid level sensor and second delay circuit are communicably coupled to the semiconductor processing tool.

6. The system of claim 2, wherein the second fluid level sensor is positioned approximately level with the first fluid level sensor within the liquid reservoir.

7. The system of claim 1, wherein the liquid reservoir is flowably connected to the semiconductor processing tool.

8. The system of claim 1, wherein the switch is positioned between the fluid level sensor and the delay circuit.

9. The system of claim 3, wherein the switch is a first switch, further comprising a second switch positioned between the second fluid level sensor and the second delay circuit.

10. The system of claim 1, wherein the liquid reservoir is flowably connected to a liquid source.

11. The system of claim 1, wherein an alarm system is configured to shut down the semiconductor processing tool.

12. A fluid level sensor system, comprising:

a first fluid level sensor positioned in a liquid reservoir at a predetermined level to ensure adequate fluid content;

a first delay circuit communicably coupled to the first fluid level sensor and configured to delay a first alarm signal from the first fluid level sensor from being transmitted to a semiconductor processing tool, wherein the first alarm signal is a first low fluid level event signal;

a second fluid level sensor positioned approximately level with the first fluid level sensor; and a second delay circuit communicably coupled to the second fluid level sensor and configured to delay a second alarm signal from the second fluid level sensor from being transmitted to the semiconductor processing tool, wherein the second alarm signal is a second low fluid level event signal, wherein the first fluid level sensor and first delay circuit and the second fluid level sensor and the second delay circuit comprise a redundant sensor system; and a switch configured to transition between sending the first alarm signal to the semiconductor processing tool and to the first delay circuit, wherein the semiconductor processing tool is configured to shut down in response to the first alarm signal indicating a first low fluid level.

13. The fluid level sensor system of claim 12, wherein the switch is positioned between the first fluid level sensor and the first delay circuit.

14. The fluid level sensor system of claim 12, wherein the switch is a first switch, further comprising a second switch positioned between the second fluid level sensor and the second delay circuit and configured to divert the second low fluid event signal from the alarm system to the second delay circuit.

15. The fluid level sensor system of claim 12, wherein the first fluid level sensor, the first delay circuit, the second fluid level sensor, and the second delay circuit are disposed in a liquid storage tank.

16. A method, comprising:

sensing a liquid level in a tank with at least one liquid level sensor;

detecting a change in the liquid level in the tank with at least one liquid level sensor for a first time period;

transmitting a low liquid level event signal from the liquid level sensor;

activating at least one delay circuit; and delaying the low liquid level event signal for a second time period, wherein:

the delaying comprises activating a switch to divert the low liquid level event signal to the at least one delay circuit based on the low liquid event signal persisting for the first time period; and the low liquid event signal causes a semiconductor processing tool to shut down.

17. The method of claim 16, wherein detecting the change in the liquid level in the tank comprises detecting wave crests and troughs in a liquid.

18. The method of claim 16, further comprising deactivating the switch to revert to a default operation.

19. The method of claim 16, wherein the switch is positioned between the liquid level sensor and at least one delay circuit.

20. The method of claim 16, wherein the first time period lasts for a duration of about 1 second.

* * * * *